US007811492B2

(12) United States Patent
Ennis et al.

(10) Patent No.: US 7,811,492 B2
(45) Date of Patent: Oct. 12, 2010

(54) PROCESS AND APPARATUS FOR TRIMMING POLYMERIC PARTS

(75) Inventors: Gary D. Ennis, Canandaigua, NY (US); Ming Lun Ho, Fairport, NY (US); David John Claudius, Manchester, NY (US); Lee D. Alexander, Canandaigua, NY (US)

(73) Assignee: Pactiv Corporation, Lake Forest, IL (US)

( * ) Notice: Subject to any disclaimer, the term of this patent is extended or adjusted under 35 U.S.C. 154(b) by 1750 days.

(21) Appl. No.: 10/818,422

(22) Filed: Apr. 5, 2004

(65) Prior Publication Data

US 2005/0000332 A1 Jan. 6, 2005

Related U.S. Application Data

(60) Provisional application No. 60/462,173, filed on Apr. 11, 2003.

(51) Int. Cl.
*B29C 45/14* (2006.01)
*B29C 37/00* (2006.01)
*B26D 1/00* (2006.01)

(52) U.S. Cl. ...................... 264/153; 264/37.3; 264/151; 264/160; 264/161; 264/210.2; 264/211.12; 264/294; 264/297.4; 264/297.5; 264/299; 83/13; 83/29; 425/289; 425/292

(58) Field of Classification Search ...................... None
See application file for complete search history.

(56) References Cited

U.S. PATENT DOCUMENTS 3,041,669 A * 7/1962 Marshall et al. ............. 425/292
3,240,851 A * 3/1966 Scalora ....................... 264/153
3,814,534 A * 6/1974 Humphreys et al. ........... 408/26
3,876,324 A * 4/1975 Ballard ....................... 408/1 R
4,104,349 A * 8/1978 Hillgenberg ................ 264/153
4,203,795 A * 5/1980 Pupp et al. .................. 156/446
4,232,592 A * 11/1980 Gingerich .................... 493/10
4,452,114 A * 6/1984 Rynik et al. .................. 83/100
4,526,074 A 7/1985 Johnson ......................... 83/97
5,062,582 A * 11/1991 Harmon et al. .......... 242/412.2
5,127,292 A * 7/1992 Kapoor .......................... 83/24
5,293,025 A * 3/1994 Wang .................... 219/121.71
5,456,559 A 10/1995 Taylor
5,795,535 A * 8/1998 Giovannone et al. ........ 264/551
6,325,952 B1 * 12/2001 Jarrett et al. ............... 264/37.3

FOREIGN PATENT DOCUMENTS

JP 62154739 * 7/1987

* cited by examiner

*Primary Examiner*—Jeffrey Wollschlager
(74) *Attorney, Agent, or Firm*—Baker Botts L.L.P.

(57) ABSTRACT

A process for forming and trimming a part comprises providing a continuous web of polymeric material, thermoforming the continuous web of polymeric material into the desired part, providing a cutter arrangement comprising a blade, providing a platen assembly comprising a closed groove that generally corresponds to the outer shape of the blade and a vacuum system, wherein at least one of the cutter arrangement and the platen assembly is moveable with respect to the at least one other assembly, trimming the part of the continuous web of polymeric material from the remainder of the continuous web of polymeric material via the blade, and removing undesirable trim material formed during the trimming of the part via the vacuum system.

22 Claims, 6 Drawing Sheets

PROCESS AND APPARATUS FOR TRIMMING POLYMERIC PARTS

CROSS-REFERENCE TO RELATED APPLICATION

This application claims the benefit of U.S. Provisional Patent Application No. 60/462,173, entitled "Process and Apparatus for Trimming Polymeric Parts," which was filed on Apr. 11, 2003 and is incorporated herein by reference in its entirety.

FIELD OF THE INVENTION

The present invention relates generally to processes and apparatuses for trimming polymeric parts and, more specifically, processes and apparatuses for trimming foam parts to eliminate or reduce trim scrap.

BACKGROUND OF THE INVENTION

Polymeric trays and containers have been used by consumers for a variety of purposes such as, for example, holding food items. One commonly used polymer for creating such trays or containers (each hereinafter referred to as a part) is an alkenyl aromatic polymer (e.g., polystyrene). One process of forming the part is to thermoform the part from a web of polymeric material. After the part has been formed in the web of polymeric material, the finished part must be trimmed from the web of material.

Generally, there are two methods of trimming the tray or container from the web of polymeric material: (a) a matching punch and die assembly; and (b) a steel rule trim tool assembly. While matching punch and die assemblies are generally durable, the process creates unwanted trimmings or shavings commonly referred to as "angel hair." To reduce the presence of angel hairs, manufactures often decrease the lip thickness of the part. However, this reduction in lip thickness adversely affects the strength of the part.

Existing steel rule die assemblies are generally less robust than punch and die assemblies, but are able to create parts with thicker lip edges resulting in a stronger part. One disadvantage of existing steel rule die assemblies is the creation of trim dust. Plastic material created from the process, include trim dust and angel hair, have a tendency to have static charge, which results in such material clinging to the parts and/or the steel rule die assembly. Trim dust is not as long or thick as angel hair, but over time the trim dust tends to build up on the processing equipment. Trim dust and angel hair are referred to herein as "trim scrap." Trim scrap buildup can result in undesirable buildups of trim scrap on the parts including large visible clumps of trim scrap. These trim-scrap clumps are transferred from the processing equipment to the parts. To remove the trim scrap from the processing equipment at levels desirable to customers results in excessive downtime of the processing operation. It is desirable to have an apparatus for forming and trimming a part that reduces or eliminates trim scrap from the finished part and a process for performing the same.

SUMMARY OF THE INVENTION

A process for forming and trimming a part is disclosed according to one embodiment of the present invention. The process comprises providing a continuous web of polymeric material, thermoforming the continuous web of polymeric material into the desired part, providing a cutter arrangement comprising a blade, providing a platen assembly comprising a closed groove that generally corresponds to the outer shape of the blade and a vacuum system, wherein at least one of the cutter arrangement and the platen assembly is moveable with respect to the at least one other assembly, trimming the part of the continuous web of polymeric material from the remainder of the continuous web of polymeric material via the blade, and removing undesirable trim material formed during the trimming of the part via the vacuum system.

A trim apparatus for trimming a thermoformed article from a web of foam plastic material is disclosed according to another embodiment of the present invention. The trim apparatus comprises a cutter having a blade shaped to generally correspond to a perimeter of the thermoformed articles and a platen assembly having a platen groove. The shape of the platen groove generally corresponds to the shape of the blade. At least one of the cutter and the platen assembly is moveable with respect to the other of the cutter and platen assembly between a first position in which the web of foam plastic material is continuously disposed between the platen assembly and the cutter and a second position in which the blade extends through the foam plastic material into the platen groove thereby cutting the thermoformed article from the continuous web and producing undesirable trim material. A forced gas path provided within the platen assembly forces a gas against the thermoformed article. A vacuum system reduces a pressure within at least a portion of the platen groove. The vacuum system and the gas from the forced gas path combine to remove the undesirable trim material.

The above summary of the present invention is not intended to represent each embodiment, or every aspect, of the present invention. Additional features and benefits of the present invention are apparent from the detailed description, figures, and claims set forth below.

Figure 1:
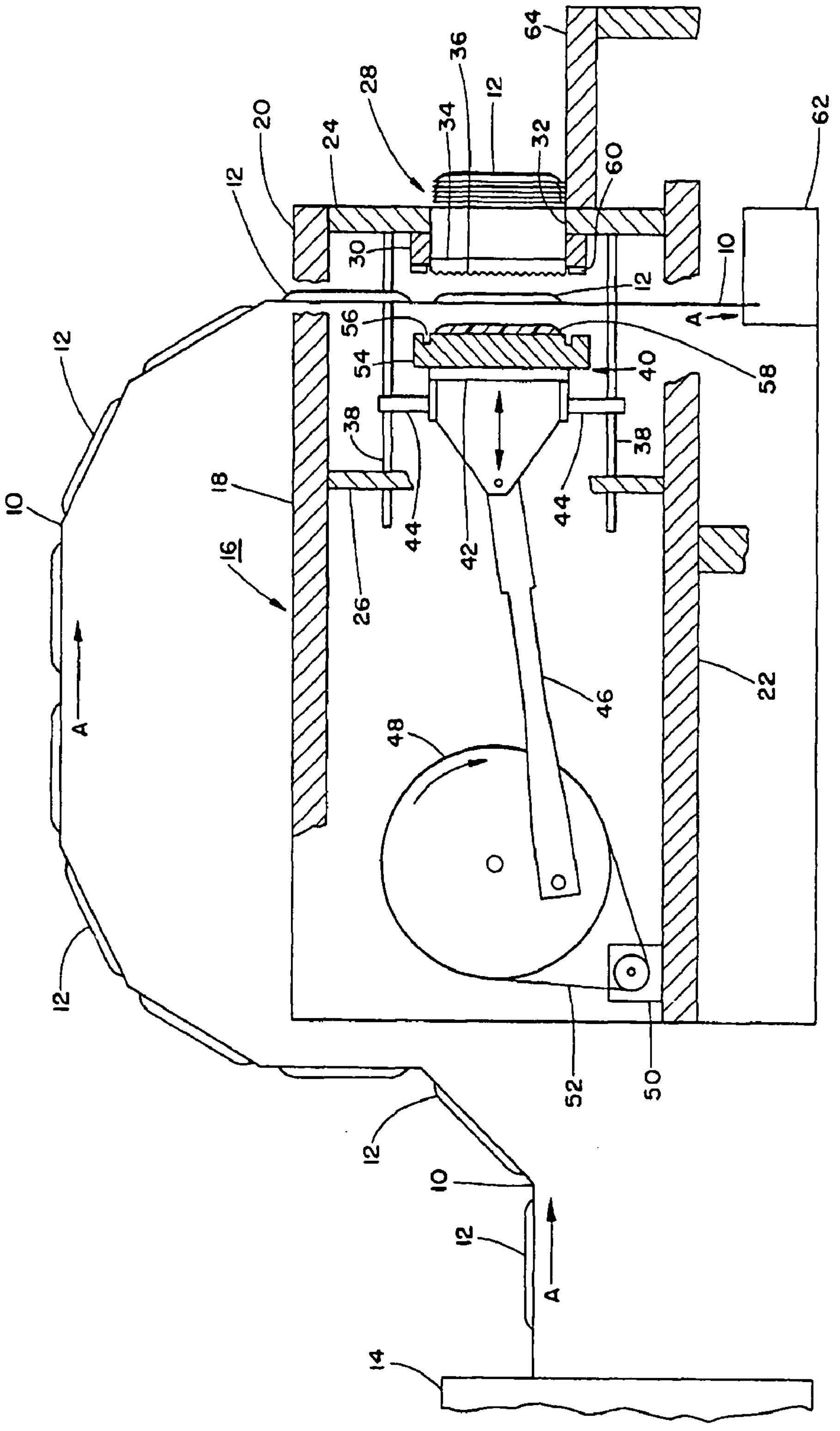
FIG. 1 is a generally schematic representation of a trim apparatus according to one embodiment of the present invention.

While the invention is susceptible to various modifications and alternative forms, specific embodiments are shown by way of example in the drawings and are described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION OF THE ILLUSTRATED EMBODIMENTS

Generally, the present invention relates to processes for trimming polymeric parts and, more specifically, to a processes for trimming parts that reduces or eliminates the presence of angel hairs and trim dust, which are collectively referred to as trim scrap. The term "part" comprises containers such as plates, cups, egg cartons, trays, bowls, carry-out containers as well as flat articles such as, for example, cake boards. The trimming process of the present invention can be used for parts of a variety of materials including thermoformed materials and other polymeric materials. For example, a polymeric part for which the trimming process of the present invention can be used may comprise an alkenyl aromatic polymer. The term "alkenyl aromatic polymer" as used herein includes polymers of aromatic hydrocarbon molecules that contain an aryl group joined to an olefinic group with only double bonds in the linear structure, such as styrene, α-methylstyrene, o-methylstyrene, m-methylstyrene, p-methylstyrene, α-ethylstyrene, α-vinylxylene, α-chlorostyrene, α-bromostyrene, and vinyl toluene. Alkenyl aromatic polymers also include homopolymers of styrene (commonly referred to as polystyrene) and rubber-modified polystyrene (commonly referred to as high impact polystyrene). The alkenyl aromatic polymer may be an oriented polystyrene (OPS).

The polymeric part may be formed from polyolefins such as polypropylene, polyethylene terephthalate (PET), polyvinyl chloride (PVC), and combinations thereof. The polymeric part may be made from a mineral-filled polymeric material such as, for example, talc or calcium carbonate-filled polyolefin.

The parts of the present invention are typically disposable, but it is contemplated that they may be reused at a future time. It is also contemplated that the containers may be made of materials such that the parts may be used in a heating apparatus such as a microwave oven and/or used in a cleaning apparatus such as a dishwasher.

Turning now to the drawings and initially to FIG. 1, a continuous web or sheet of a thermoformable polymer sheet material 10 into which a succession of thermoformed articles or parts 12 have been molded or thermoformed in a thermoformer 14 is conveyed in the direction of arrows A. The parts 12 may comprise moldings in the shape of, for instance, plates, cups, egg cartons, trays, bowls, carry-out containers, or the like as discussed above. The web 10 with the thermoformed parts 12 molded therein is conveyed in a predetermined intermittent manner through the intermediary of suitable feed or indexing devices (not shown) to a trim apparatus 16 constructed in accordance with the present invention.

The trim apparatus 16 comprises a stationary support frame 18 including generally horizontal frame support members 20 and 22 that are interconnected by generally upright support members 24 and 26. Supported by the vertical frame members 24 and 26 is a cutter arrangement 28 for trimming or severing the thermoformed parts 12 from the polymer material web 10 as is described in detail herein.

Figure 2:
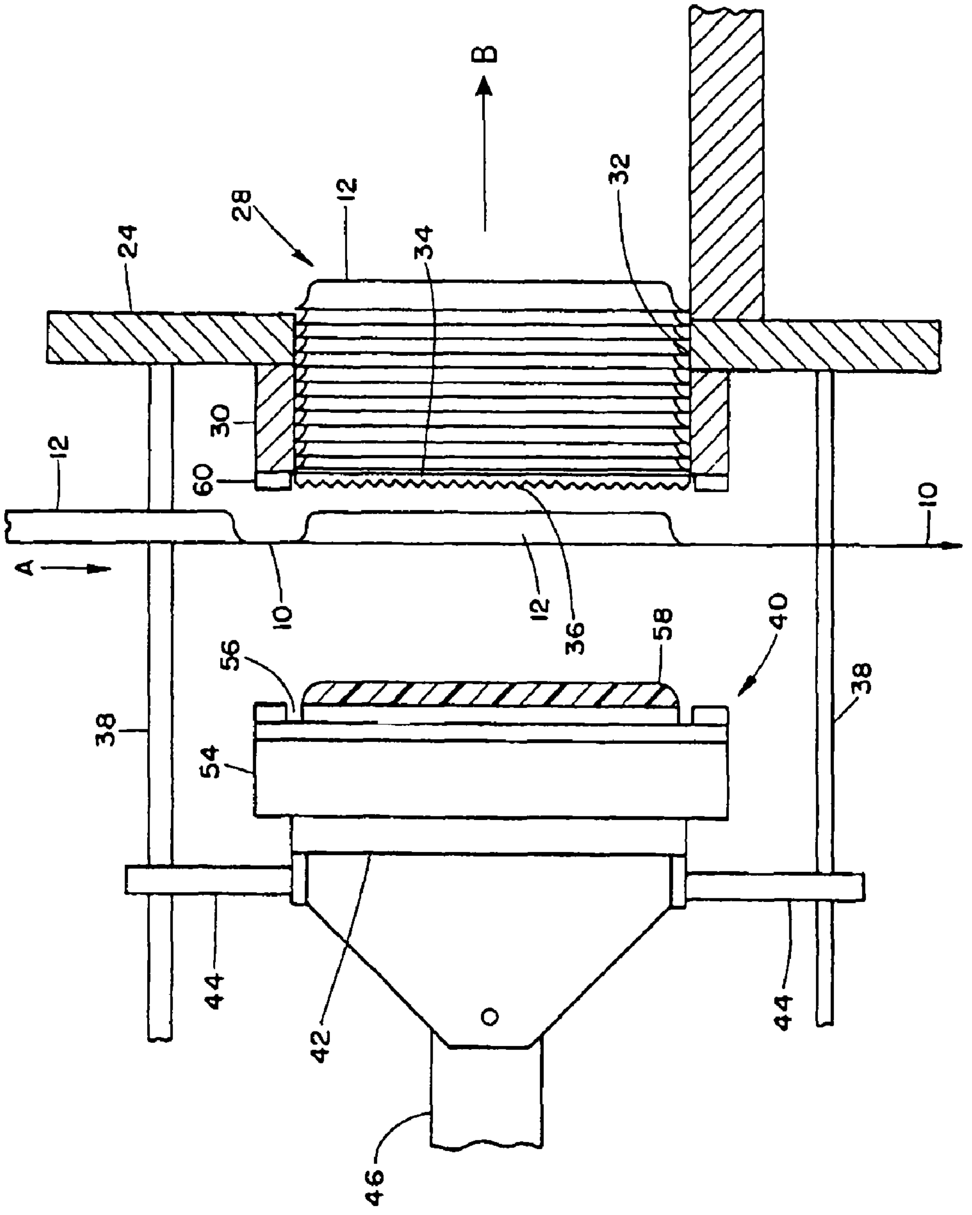
FIG. 2 is a generally schematic representation of a cutting blade structure of trim apparatus of FIG. 1 with the male locator in a retracted position.
Figure 3:
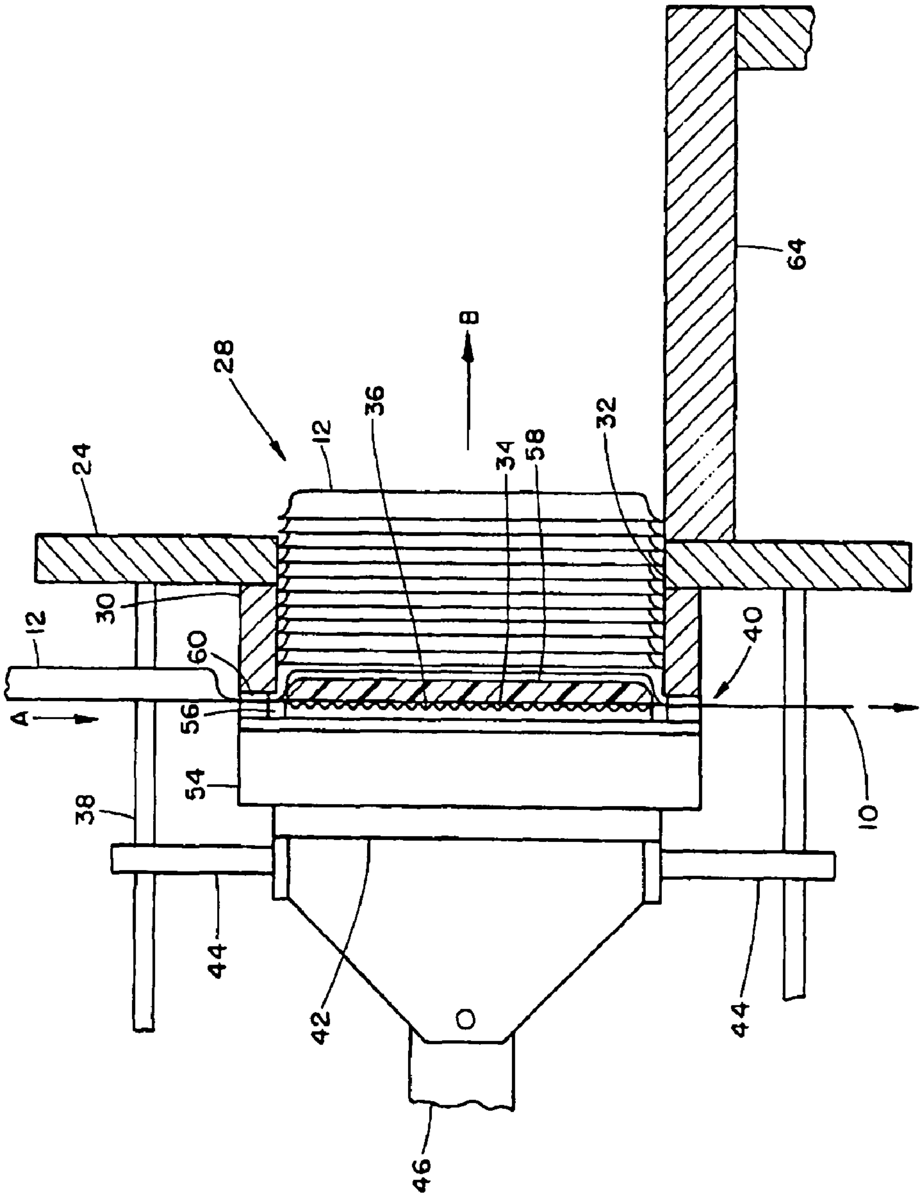
FIG. 3 is a generally schematic representation of the male located of FIG. 2 in an advanced position.

The cutter arrangement 28 is supported on the generally upright support member 24, which forms a stationary platen. The cutter arrangement 28 includes a horizontally projecting mounting and spacer member 30 that defines a central opening or cavity 32 generally in conformance with the outer peripheral configuration of the thermoformed articles or parts 12 that are to be severed from the polymer material web 10. A cutting blade 34, as shown in greater particularity in FIGS. 2 and 3, is constructed of a thin tempered spring steel metal strip according to one embodiment of the present invention. It is contemplated that the blade 34 may be constructed of other materials. The cutting blade 34 is fastened about the circumference of the opening 32 in the mounting and spacer member 30. The cutting blade 34 includes a serrated or toothed cutting edge 36 along its length which faces towards the polymer material web 10 (to the left as viewed in FIG. 1). The cutting blade 34 is beveled on one or both sides in alternative embodiments of the present invention to facilitate the removal of the part 12 from the web 10.

Fastened to the upright member or stationary platen 24 is a plurality of generally horizontally extending guide rods 38 supporting a movable male part locator assembly 40 for reciprocatory movement towards and away from the cutter arrangement 28.

The male locator assembly 40 comprises a movable platen 42 that includes a plurality of slide arms 44 adapted to be reciprocated along the guide rods 38 through the action of a crankarm 46 that is activated by a rotatable flywheel 48. The flywheel 48 may be connected to a drive motor 50 through a suitable belt drive 52 that translates the rotary motion of the flywheel 48 into the reciprocatory movement of the male locator assembly 40.

Fastened on the forwardly facing surface of the movable platen 42, in essence facing the cutter arrangement 28, is a male locator plate 54 that is encompassed by a recess 56 for receiving the toothed cutting edge 36 of the cutter blade 34 at the end of the forward stroke of the male locator assembly 40 towards the cutting arrangement 28. Fastened to the front surface of the plate 54 is a protruding element 58, which may comprise pliant bristles or a similarly resilient material and which is configured so as to conform with the interior dimensions of a thermoformed part 12 molded into the web 10 upon the forward stroke of the male locator assembly 40.

Extending about the cutting edge 36 of the cutter blade 34 is a sponge-like stripper 60 that is adapted to remove any trim scrap from the cutter blade 34 during the trimming operation by the apparatus.

Positioned below the cutting arrangement 28 is a scrap grinder 62 for receiving and processing of the polymer material web remainder from which the thermoformed parts 12 have been trimmed by the apparatus.

Turning to FIGS. 2 and 3, the operation of the trim apparatus 16 will be described according to one embodiment of the present invention. The polymer material web 10 into which the thermoformed parts 12 have been molded is conveyed from the thermoformer 14 by a suitable feeding or indexing device (not shown) into the gap that is present intermediate the male locator assembly 40 and the cutting arrangement 28 when the male locator assembly 40 is in its retracted position (FIG. 2). The feed device for the polymer material web 10 indexes the male locator assembly 40 so as to position a thermoformed part 12 molded into the web 10 into alignment with the cavity or recess 32 defined within the periphery of the cutter blade 34.

Concurrently, the flywheel 48 is rotated in synchronism with the positioning of the part 12 in the gap to thereby advance the crankarm 46 forwardly so as to cause the movable platen 54 to slide along the guide rods 38 into engagement with the cutting arrangement 28. The throw of the crankarm 46 during the rotation of flywheel 48 is calibrated so that the protruding element 58 that is fastened onto the front surface of the platen 54 enters the thermoformed part 12, which is positioned in the gap in axial alignment therewith. The platen 54 urges the part 12 onto the serrated or toothed cutting edge 36 of the cutter blade 34 causing the blade 34 to trim or sever the thermoformed part 12 from the polymer material web 10. The thermoformed part 12 is retained or captured on the sharp points of the toothed edge 36 as would a so called "cookie cutter." During this trimming sequence of the part 12, the trim scrap that is formed about the serrated cutting edge 36 is brushed off the cutter blade by use of the wiping action of the sponge-like cushion 60 that extends about the circumference of the cutting edge portion of the cutter blade 34. During the retractive movement of the male locator assembly 40 away from the cutting arrangement 28, the severed thermoformed part 12 is retained in position within the recess 32 by the serrated cutting edge 36 of the cutter blade 34 is shown in FIGS. 2 and 3.

In synchronism with the movement of the male locator assembly 40 being returned into its retracted position (FIG. 2), the web 10 is advanced so that a successive thermoformed part 12 therein is moved in the direction of arrows A into the gap in axial alignment with the assembly 40 and cutting arrangement 28 as described above. Referring back to FIGS. 2 and 3, the article trimming sequence of the apparatus is now repeated, with the successively severed thermoformed parts 12 advancing the previously severed parts 12 into the cavity or recess 32 in the direction of arrow B, thereby causing the severed thermoformed parts 12 to produce a nested stack that slides onto a platform or a packing table 64 from which the stack may then be manually or automatically removed. The remaining portion of the polymer material web 10 from which the thermoformed parts 12 have been trimmed by the apparatus is advanced into a suitable scrap grinder 62 (FIG. 1) for further processing and/or recycling of the comminuted scrap material.

The cutter or trimming blade 34 may be fastened within the opening 32 in mounting member 30 through suitable fastening means, such as recessed or countersunk screws (not shown). The cutter blade 34 may be constituted of a thin strip of tempered spring steel having a thickness in the range of about 0.003 inch to 0.025 inch, and is about 0.001 inch thick according to one embodiment of the present invention. The cutter blade 34 includes a sharply-pointed toothed or serrated cutting edge 36 having about 5 teeth per linear inch of blade length and with each cutting tooth subtending an angle of about 60 degrees to provide for excellent cutting performance and little blade wear according to one embodiment of the present invention. It is contemplated that other cutter blades may be employed in other embodiments of the present invention.

The trim apparatus 16 may be adapted for the trimming of differently configured thermoformed parts 12 from a polymer material web 10 by merely providing inserts within the cavity 32 in conformance with the external peripheral configuration of the thermoformed part 12, and with the cutter blade 34 being correspondingly shaped. Such an arrangement also necessitates that the platen 54 with the protruding element 58 be replaced by another movable platen dimensioned in conformance with the internal configuration of the thermoformed parts 12, thereby imparting versatility to the apparatus in the trimming of differently configured thermoformed parts 12 from a web 10.

Thus far, a single thermoformed article trimming apparatus has been illustrated and described. It would be obvious to one skilled in the art that for a web 10 that includes a plurality of thermoformed parts 12 molded therein in a side-by-side or tandem relationship to have a plurality of side by side trimming apparatuses. For example, such an apparatus may include a plurality of concurrently acting cutting trimming arrangements 28 and male locator assemblies 40 in tandem or side-by-side relationship, which may be located to provide for the concurrent trimming of a plurality of such thermoformed parts 12 during each forward advance of the male locator assembly 40 into engagement with the cutting arrangement 28.

Figure 4:
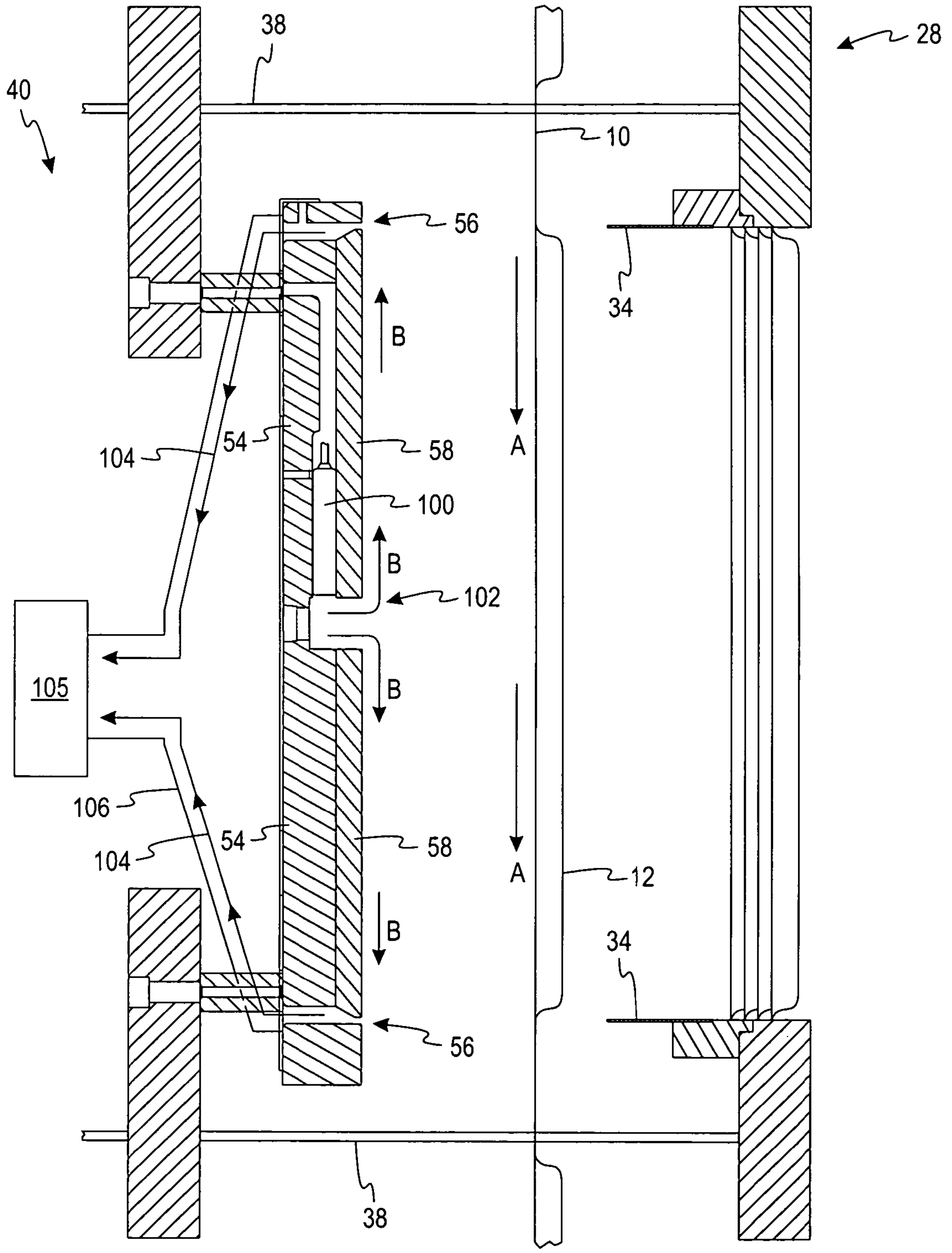
FIGS. 4 and 5 are sectional-side views of the male locator in the retraced and advanced positions, respectively, according to one embodiment of the present invention.
Figure 5:
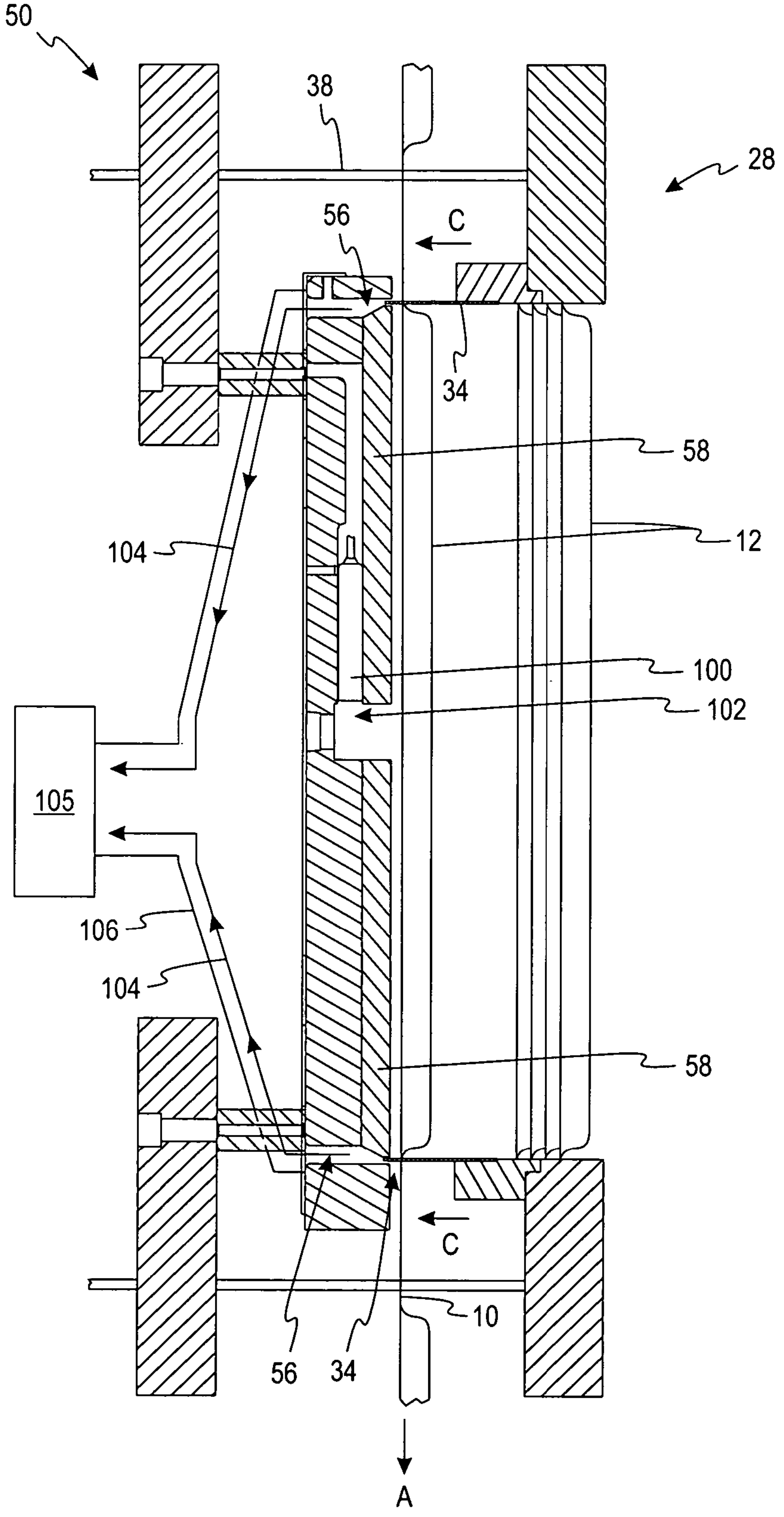

Referring now to FIGS. 4 and 5, a sectional side view of the male locator assembly 40 and the cutter arrangement 28 are shown in the uncompressed and compressed positions, respectively, according to one embodiment of the present invention. The cutter arrangement 28 implements a blower unit and a vacuum unit to reduce or eliminate the presence of trim scrap on the cut parts 12 and within the trim apparatus 16.

The male locator assembly 40 includes an air de-ionizer unit 100 for de-ionizing air from an air supply according to one embodiment of the present invention. The deionized air exits the male locator plate 54 at an outlet 102. From the outlet 102, the deionized air is forced against the web 10 and directed across the face of the protruding element 58 of the plate 54. A proximate side of the deionized air path is formed by the protruding element 58, the opposing side is formed by the web 10 of sheet material—particularly a formed part 12 in the web 10 of sheet material—when the plate 54 pushes the web 10 against the cutting blade 34. This path directs the deionized air from the outlet 102 disposed toward a center of the plate 54 outwardly toward the edges of the plate 54 and across the interior face of the cutting blade. The flow of deionized air across the face of the protruding element 58 initiates air flow outwardly along the trimmed part 12 to keep the particles off of the trimmed part 12. The forced deionized air moves across the face of the protruding element 58 and is directed toward the recess 56, which forms the inlet of the vacuum path. This air flow is shown in FIGS. 4 and 5 as Arrow B.

Deionized air is used to combat the inherent static properties of the web 10 of thermoformed or plastic material. These static properties are exacerbated by the movement of the cutting blade 34 across the material. Other gases may be used in alternative embodiments of the present invention.

As discussed in connection with FIGS. 1-3, the plate 54 is surrounded by a recess 56 for receiving the toothed cutting edge 36 of the cutter blade 34 at the end of the forward stroke of the male locator assembly 40 toward the cutting arrangement 28. The recess 56 forms the inlet of a vacuum path 104, the terminal end of which is in fluid communication with a vacuum unit 105. The male locator assembly 40 and the cutter blade 34 come together to create a closed groove at the recess 56 through which trim material is removed. The vacuum unit 105 moves air across the exterior face of the cutting blade 34 when the cutting blade 34 is inserted into the recess 56. This air flow is shown in the FIGS. 4 and 5 as Arrow C. To a lesser extent, the vacuum unit 105 also moves air, including the deionized air, across the interior face of the cutting blade 34 when the cutting blade 34 is inserted into the recess 56. The air flow created by the vacuum unit 105 removes the undesirable trim scrap from the cutting arrangement. Without this removal, the trim scrap collects on the trim parts 12 as discussed above. The undesirable trim material is evacuated through the recess 56 along the vacuum path 104 and is eventually collected at a trim material collection area along the vacuum path. A manifold 106 attached to the rear side of the male locator assembly 40 fluidly couples the vacuum unit 105 to the recess 56. The vacuum unit 105 draws the trim scrap from the recess 56 and through the manifold 106.

It is contemplated that the manifold and the vacuum unit may be located differently than depicted in FIGS. 4 and 5. The undesirable trim scrap may be removed via the recess such that this scrap exits above or below the vacuum unit 105 depicted in FIGS. 4 and 5. Thus, the undesirable trim scrap may be removed either in a horizontal or a vertical direction. One example is locating the vacuum unit near the bottom of the plate 54 in FIGS. 4 and 5 so that gravity also assists in removing the undesirable trim scrap. It is also contemplated that the manifold may be shaped differently than shown in FIGS. 4 and 5.

Figure 6:
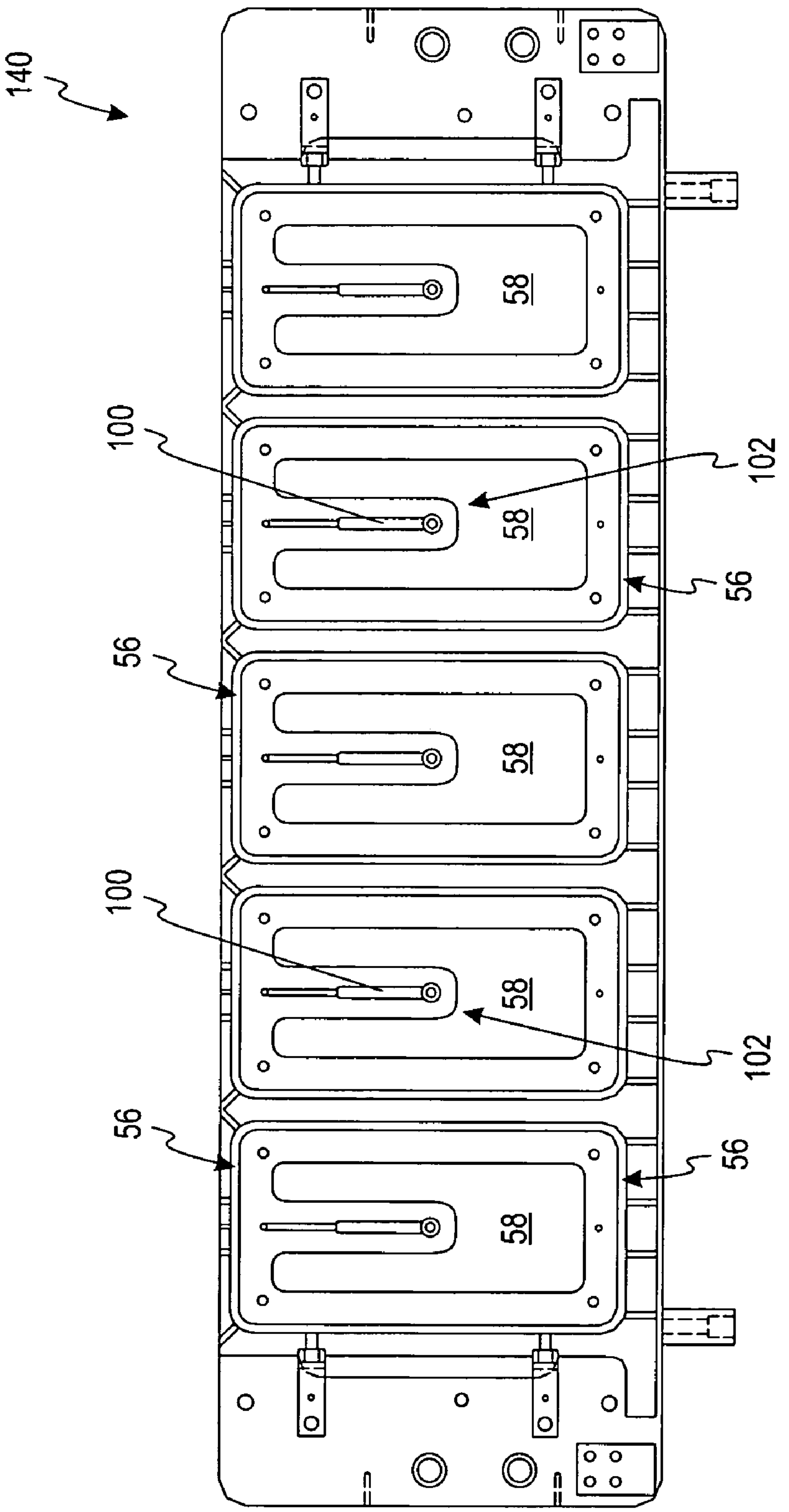
FIG. 6 is a front view of a male locator assembly according to an alternative embodiment of the present invention.

Referring now to FIG. 6, while the trim apparatus 16 of the present invention has been described in connection with a single male locator assembly 40 and cutter arrangement 28, a plurality of locator assemblies and cutter arrangements 28 can be used collectively in alternative embodiments of the present invention. FIG. 6 shows a male locator assembly 140 is shown for use with a trim apparatus 16 (FIG. 1) having five cutting tools (e.g., five locator assemblies 40 and cutter arrangements 28) is shown. A manifold, similar to manifold 106 attaches to the back side of the male located assembly 140 for coupling the plurality of recesses 56 to a common vacuum unit 105. The air inlets 102 may also be coupled to a common air supply as well as a common air deionizing unit. Alternatively, a plurality of air deionizing units 100 may be used as illustrated in FIG. 6.

The strength of the vacuum unit to be used in connection with the present invention depends on the number of cutting tools used. For a five-wide tool, the following commercially available vacuum may serve as the vacuum member in the trim apparatus according to one embodiment of the present invention. For example, a Model No. SCL 70 SH MOR Regenerative Blower that is commercially available from FPZ Inc. of Grafton, Wis. may be used in connection with some embodiments of the present invention. The vacuum should be strong enough to pull trim material along the vacuum path, but not so strong that the skeleton (the excess web material after the trimming operation) is pulled into the recess 56 and vacuum path.

While the male locator assembly 40 has been described as moving and the cutter arrangement 28 as stationary thus far, the opposite arrangement may be use in alternative embodiments of the present invention. For example, the cutter arrangement may be movable while the male locator arrangements may be stationary. It is also contemplated that both the cutter arrangement and the male locator arrangement may be movable with respect to each other.

While the invention is susceptible to various modifications and alternative forms, specific embodiments thereof have been shown by way of example in the drawings and herein described in detail. It should be understood, however, that it is not intended to limit the invention to the particular forms disclosed, but on the contrary, the intention is to cover all modifications, equivalents, and alternatives falling within the spirit and scope of the invention as defined by the appended claims.

What is claimed is:

1. A process of trimming a part formed in a web of polymeric material, the process comprising:

providing a web of polymeric material having a part formed therein, the part having a perimeter;

moving the web of polymeric material between a cutter having a blade with a shape generally corresponding to the perimeter of the part and a platen assembly having a recess therein generally corresponding to the shape of the blade wherein the blade is adapted to be received at least partially within the recess, at least one of the platen assembly and cutter being movable with respect to the other;

trimming the part from the web of polymeric material using the blade, the trimming resulting in trim material;

creating a flow path of deionized air across the platen assembly to a vacuum fluidly coupled within the recess; and drawing the trim material away from the blade via the flow path to the vacuum fluidly coupled within the recess.

2. The process of claim 1 wherein the vacuum is continuous during trimming.

3. The process of claim 1 wherein the blade is constructed of steel.

4. The process of claim 1 wherein the polymeric material is an alkenyl aromatic polymer.

5. The process of claim 4 wherein the polymeric material is polystyrene.

6. The process of claim 4 wherein the polymeric material is polystyrene foam.

7. The process of claim 1 wherein the part is selected from a group consisting of a bowl, a plate, a cup, a food container, and a tray.

8. The process of claim 1 wherein the platen assembly moves with respect to the cutter.

9. The process of claim 1 wherein the cutter moves with respect to platen assembly.

10. The process of claim 1 wherein the platen assembly and the cutter move with respect to each other.

11. The process of claim 1 wherein trimming comprises receiving the blade within the recess to define a closed groove.

12. The process of claim 1, wherein the flow path passes across a first face of the blade when the blade is received within the recess.

13. The process of claim 12, wherein the vacuum defines an air flow across a second surface of the blade when the blade is received within the recess to draw trim material away from the second surface of the blade to the vacuum fluidly coupled within the recess.

14. A process for forming and trimming a part, the process comprising:

providing a web of polymeric material;

thermoforming a portion of the web of polymeric material into a part having a perimeter;

providing a cutter comprising a blade having a shape generally corresponding to the perimeter of the part;

providing a platen assembly comprising a recess generally corresponding to the shape of the blade, wherein at least one of the cutter and the platen assembly is moveable with respect to the other of the cutter and the platen assembly to receive the blade within the recess, the recess defining a closed groove when the blade is received therein, and further providing a vacuum system having an inlet fluidly coupled within the recess;

trimming the part from the web of polymeric material via the blade; and removing trim scrap resulting from the trimming of the part, the trim scrap being removed via an air flow across a face of the blade within the recess, the air flow created by the vacuum system, and further forcing air across the platen assembly to define a flow path across an opposite face of the blade to the vacuum system.

15. The process of claim 14 wherein the polymeric material is an alkenyl aromatic polymer.

16. The process of claim 15 wherein the polymeric material is polystyrene.

17. The process of claim 14 wherein the part is selected from a group consisting of a bowl, a plate, a cup, a food container, and a tray.

18. The process of claim 14 wherein the vacuum system operates continuously during the trimming of the part.

19. The process of claim 14 wherein the platen assembly moves with respect to the cutter.

20. The process of claim 14 wherein the cutter moves with respect to the platen assembly.

21. The process of claim 14 wherein the platen assembly and the cutter move with respect to each other.

22. The process of claim 14 wherein forcing air comprises forcing deionized air.

* * * * *